Dec. 31, 1963 I. HOROWITZ 3,116,462
AUDIO-TONE CONTROL CIRCUIT
Filed March 24, 1959
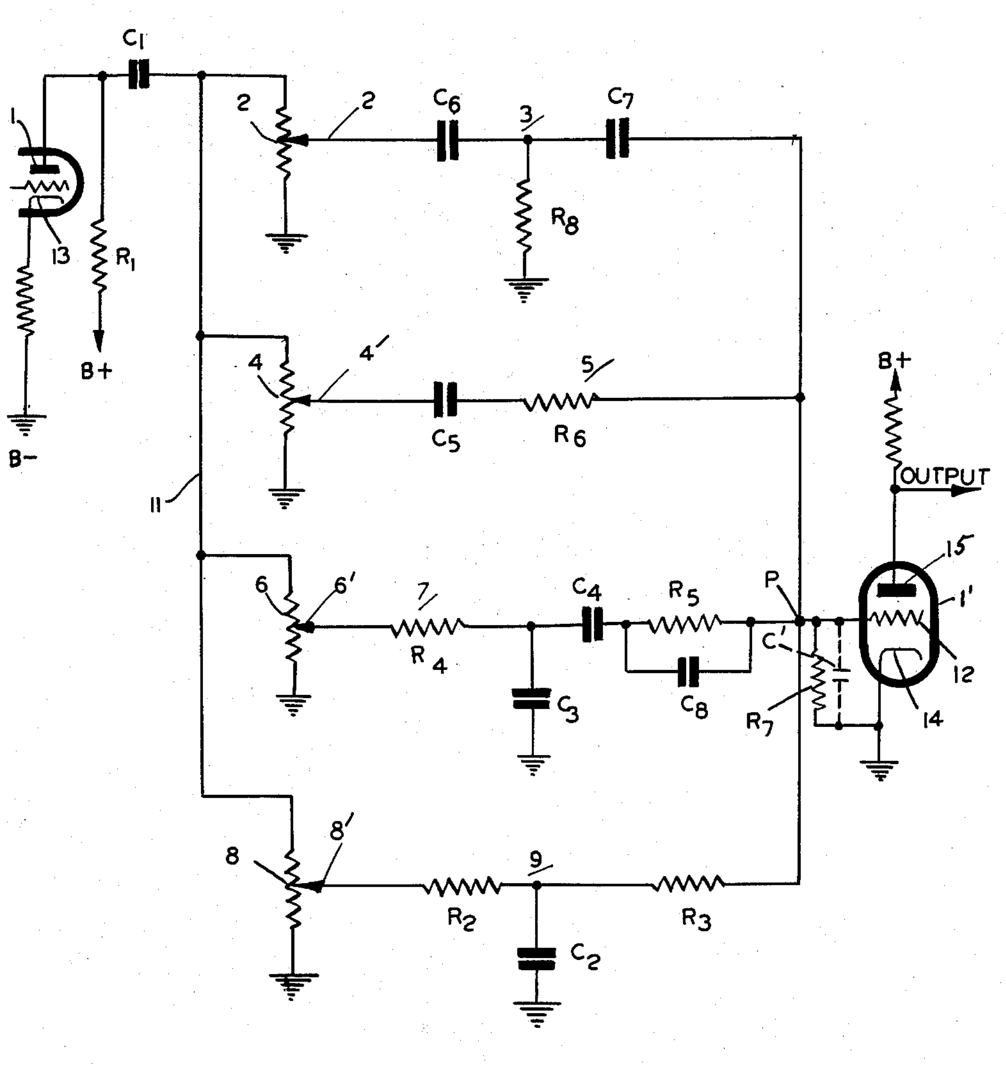
INVENTOR
IRVING HOROWITZ
BY Rines and Rines
ATTORNEYS 3,116,462

AUDIO-TONE CONTROL CIRCUIT

Irving Horowitz, Eatontown, N.J., assignor to Blonder-Tongue Electronics, Newark, N.J., a corporation of New Jersey Filed Mar. 24, 1959, Ser. No. 801,655
5 Claims. (Cl. 330—157)

The present invention relates to frequency-control circuits, and more particularly, to circuits that permit of selective adjustment of a level of response to any of a plurality of frequency bands disposed within a predetermined frequency band.

While the invention will be hereinafter described in connection with its important application to audio frequencies, it is, however, to be understood that the invention may also be employed with other frequencies than audio frequencies. It has been customary in audio-amplifying circuits to provide controls that adjust the amplitude response over a predetermined frequency band. By and large, such controls operate both upon the low- and the high-frequency portions of the audio spectrum simultaneously, and including the intermediate portions of the spectrum, as well.

It is an object of the present invention, however, to provide a simple, effective means for controlling the amplitude of selected adjacent bands of frequencies, within a predetermined frequency band, independently and without interference with other adjacent bands.

A further object is to provide a new and improved audio-tone control device.

Other and further objects will be explained hereinafter, and will be more particularly pointed out in the appended claims.

The invention will now be described in connection with the accompanying drawing, the single FIGURE of which illustrates a circuit diagram of a preferred embodiment of the invention.

A source of audio-frequency signals may comprise a conventional audio amplifier stage 1, the details of which may be quite conventional and are not illustrated in order to confine the drawing to the features of the present invention. The tube 1 may receive plate voltage through an anode load R1 from the B+ terminal of an anode supply source, the negative terminal B— of which may be connected to the cathode 13 of the tube 1, and grounded, as shown. The output of the audio-frequency amplifier 1 feeds signals over the complete audio spectrum through a coupling capacitor $C_1$ to a plurality of potentiometers 2, 4, 6 and 8, all grounded and thus in parallel with the source 1.

Associated with the corresponding sliders 2′, 4′, 6′ and 8′ of the respective potentiometers 2, 4, 6 and 8, are a plurality of band-pass filter networks illustrated generally at 3, 5, 7 and 9, each connected to the respective sliders 2′, 4′, 6′, and 8′.

Considering, first, the potentiometer 8, this may be used for controlling the amplitude of a band of low frequencies in the audio band, peaked at, for example, a frequency of about 60 cycles. The network 9 is of the resistance-capacitance band-pass type, embodying the initial coupling capacitor $C_1$, the resistance of all of the connections along conductor 11 to the potentiometer 8, the series resistor $R_2$ and the shunt capacitor $C_2$, peaked to the 60 cycles, before-mentioned. The network 9 thus comprises the high-pass capacitance $C_1$ and effective resistance of all of the connections down to potentiometer 8, and the low-pass section $R_2$, $C_2$. Since it is desired to prevent interaction between the networks, an attenuating isolating resistance $R_3$ is provided between the junction of resistor $R_2$ and capacitor $C_2$ and a terminal P common to all the networks 3, 5, 7 and 9. The terminal P is connected to the control electrode 12 of the next succeeding amplifier stage 1′. Were the isolating resistor $R_3$ not employed, the relatively large capacitor $C_2$ would undesirably appear across the input circuit of the amplifier stage 1′. Adjustment of the slider 8′ will thus control the amplitude of the response of the network 9, coupling the stages 1 and 1′ in the region of the 60-cycle band.

The potentiometer slider 6′ is similarly connected through a band-pass resistance-capacitance network 7 of a slightly different variety, embodying the series resistor $R_4$, the shunt capacitor $C_3$, the series capacitor $C_4$ and a further series resistor $R_5$. The elements $R_4$, $C_3$ comprises a low-pass section, and the elements $C_4$, $R_5$, a high-pass section. Resistor $R_5$ thus serves not only as part of the high-pass section, but, also, as an isolating resistor and as an element of the voltage divider network $R_5$, $R_7$. The network 7 is tuned in the neighborhood of, for example, 300 cycles and is connected to the common terminal P.

The potentiometer slider 4′ is also connected through a resistance-capacitance band-pass network 5 comprising a series capacitor $C_5$ and a series resistor $R_6$, the shunt input resistance $R_7$ between the control electrode 12 and the cathode 14 of the amplifier stage 1′, and whatever capacitance C′ exists in the input circuit at point P. The elements $C_5$, $R_6$ constitute a high-pass filter section and the element $R_7$ and capacitance C′ constitute a low-pass section. The resistor $R_6$ thus also serves as an isolation resistance and as part of the voltage divider $R_6$, $R_7$. The network 7 is tuned to resonate at, for example approximately the 1500-cycle center frequency.

The high-frequency network 3, tuned in the neighborhood of, for example, 7000 cycles, comprises the series capacitor $C_6$, the shunt resistor $R_8$, the further series capacitor $C_7$ and the input resistor $R_7$, being a two-$\pi$ high-pass type filter. Since the network 3 is a two-stage network having a phase shift that will approach, at some frequency, substantially to 180 degrees, it is desired to correct one of the other networks so that no trap may exist at a particular frequency as a result of this 180-degree phase shift effecting cancellation of the signals sent along one of the other networks. To this end, a capacitor $C_8$ is connected in parallel with the resistor $R_5$ to advance the phase of the energy fed along network 7 at that particular frequency at which such trap would occur. At higher frequencies, capacitances $C_7$ and C′ act as capacitive voltage divider elements in view of the low reactance presented at P at such frequencies.

Through this expedient, therefore, independent control of the relative amplitude response of successive bands or frequencies within the complete audio-frequency band may be effected between the stages 1 and 1′. The operator, by adjustment of sliders 2′, 4′, 6′ and 8′, may compensate for any desired aberration, distortion or undesired relative amplitudes existing in the original audio signals, and the controls may also be used to produce unusual audio effects by accentuating or minimizing certain preselected frequency bands within the audio spectrum.

It should be observed that the capacitance C′ is mainly Miller-effect capacitance reflected back from the plate 15 of the triode 1′, and if a triode is not used, a physical capacitor must be employed at C′. Additional band-pass networks may, of course, be added, if desired, as may additional frequency-selective circuits be disposed in each band-pass network to permit a control of narrower bands of frequencies by each band-pass network.

Further modifications will occur to those skilled in the art, and all such are considered to fall within the spirit and scope of the invention as defined in the appended claims.

What is claimed is:

1. A frequency control having, in combination, a source of signals extending over a predetermined frequency band, a plurality in excess of two of independent potentiometers each having a slider, means for connecting each of the plurality of potentiometers in parallel with the source, a plurality of band-pass networks, one corresponding to each potentiometer and each tuned to pass successively displaced bands of frequencies within the predetermined band with common electrical components shared by the networks, means for connecting each of the band-pass networks with the corresponding potentiometer slider, passive electrical means for connecting all the band-pass networks to a common terminal, and the connection from one of the band-pass networks to the said common terminal including phase-shifting means for preventing substantial cancellation at the common terminal of signals of predetermined frequency fed thereto from one of the other band-pass networks.

2. An audio-tone control having, in combination, a source of signals extending over a predetermined audio-frequency band, a plurality of excess of two of independent potentiometers each having a slider, means for connecting each of the plurality of potentiometers in parallel with the source, a plurality of band-pass networks, one corresponding to each potentiometer and each tuned to pass successively displaced bands of frequencies within the predetermined band with common electrical components shared by the networks, passive electrical means for connecting each of the band-pass networks with the corresponding potentiometer slider, means for connecting all the band-pass networks to a common terminal, and the connection from one of the band-pass networks to the said common terminal including phase-shifting means for preventing substantial cancellation at the common terminal of signals of predetermined frequency fed thereto from one of the other band-pass networks.

3. An audio-frequency system having, in combination, first and second audio-frequency amplifier stages for amplifying a predetermined band of audio signals, a tone control connected between and coupling the output of the first stage and the input of the second stage and comprising a plurality in excess of two of independent potentiometers each having a slider, means for connecting each of the plurality of potentiometers in parallel with the first-stage output, a plurality of band-pass networks, one corresponding to each potentiometer and each tuned to pass successively displaced bands of frequencies within the predetermined band, means for connecting each of the band-pass networks with the corresponding potentiometer slider, and means for connecting all the band-pass networks to a common terminal of the second-stage input, means being provided in the connection from one of the band-pass networks to the said common terminal for introducing a phase shift in order to prevent substantial cancellation of signals of predetermined frequency fed thereto from one of the other band-pass networks.

4. Apparatus as claimed in claim 3 and in which four potentiometers and corresponding networks are provided tuned, respectively, approximately to 60 cycles, 300 cycles, 1500 cycles and 7000 cycles.

5. Apparatus as claimed in claim 3 and in which the higher-frequency network comprises a two-$\pi$ high-pass network, and the other networks each comprise high-pass and low-pass sections.

References Cited in the file of this patent

UNITED STATES PATENTS

| | | |
|---|---|---|
| 2,174,166 | Plebanski | Sept. 26, 1939 |
| 2,195,152 | Roux et al. | Mar. 26, 1940 |
| 2,558,868 | McCarty | July 3, 1951 |
| 2,694,954 | Kock | Nov. 23, 1954 |
| 2,907,838 | Ross | Oct. 6, 1959 |

FOREIGN PATENTS

| | | |
|---|---|---|
| 963,109 | France | Dec. 19, 1949 |
| 645,256 | Great Britain | Oct. 25, 1950 |